April 7, 1959
J. C. HOSKEN
2,881,416
APPARATUS FOR CONVERTING ANALOGUE INFORMATION
INTO DIGITAL INFORMATION
Filed Sept. 4, 1952
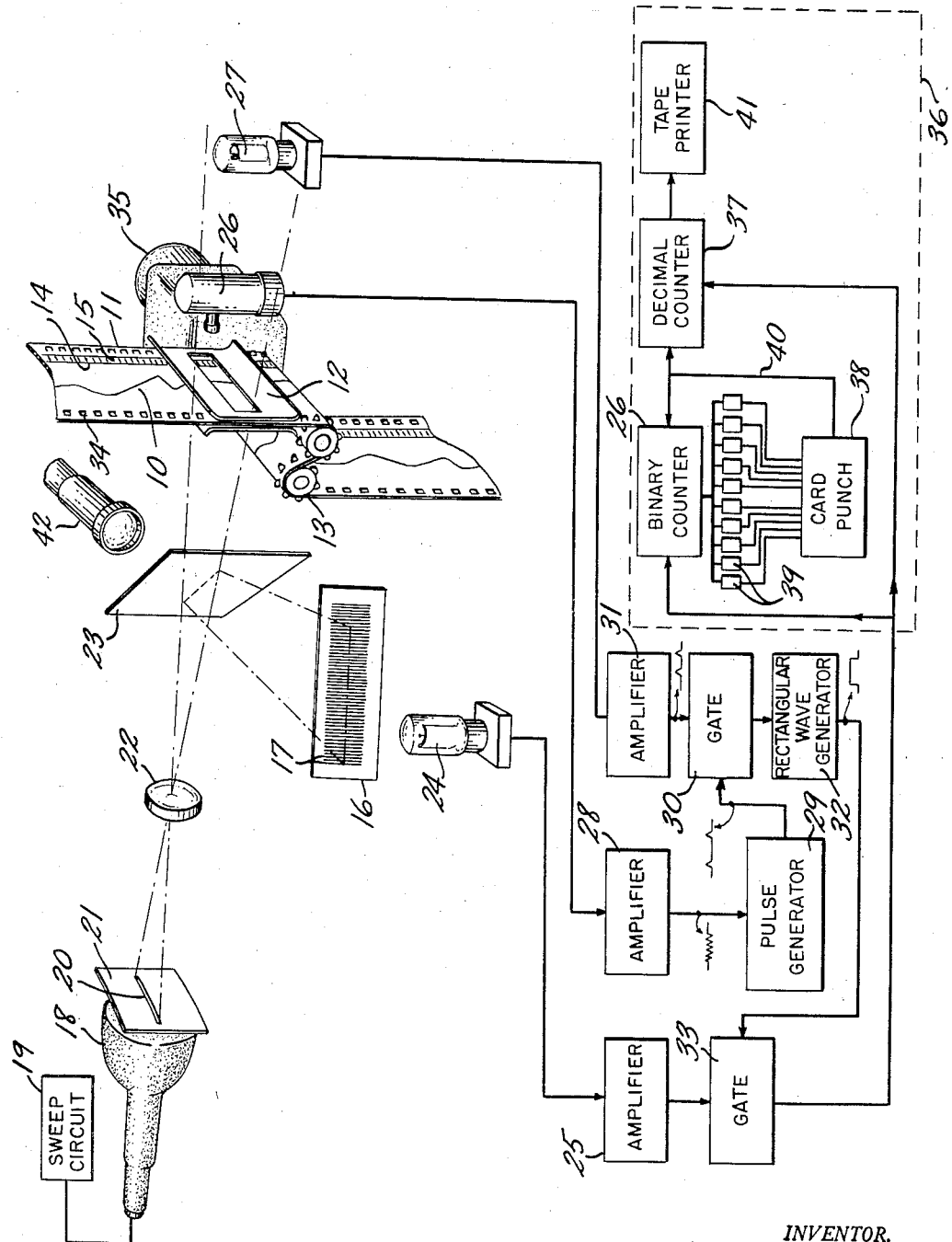
INVENTOR.
JAMES C. HOSKEN
BY
Campbell, Brumbaugh, Free & Graves
his ATTORNEYS

United States Patent Office 2,881,416
Patented Apr. 7, 1959

2,881,416

APPARATUS FOR CONVERTING ANALOGUE INFORMATION INTO DIGITAL INFORMATION

James C. Hosken, Boston, Mass., assignor to Arthur D. Little, Inc., Cambridge, Mass., a corporation of Massachusetts Application September 4, 1952, Serial No. 307,740

14 Claims. (Cl. 340—347)

The present invention relates to the conversion between analogue and digital information and, more particularly, to apparatus for recurrently converting a dependent variable quantity that is a function of an independent variable quantity into a plurality of electrical pulses, the number of which represents the value of the dependent quantity for particular values of the independent quantity.

It is often necessary to convert analogue information in the form of a variable amplitude into digital information whereby the amplitude is represented by groups of impulses suitable for recording on punched cards or printed tape or for supplying as a signal to a digital computer. Apparatus is well known wherein an amplitude is converted into a recurrent time interval, and the time interval is employed to key or gate pulses of a constant repetition rate, whereby a particular amplitude is represented by a particular number of such pulses. One of the problems inherent in this type of apparatus is the necessity for maintaining accurate control over the pulse repetition rate and constant relationship between the amplitude and the corresponding time interval.

It is an object of the present invention to provide apparatus for converting from analogue into digital information without depending upon accurate timing relationships.

Another object of the invention is to provide apparatus wherein the analogue information is indicated in spatial terms and counting pulses are generated in response to spatial increments to prevent variations in the timing of the apparatus from introducing errors.

The invention contemplates converting analogue information that is indicated or recorded in the form of a variable distance between either two points or two lines on a screen into digital information. The screen is recurrently scanned with an analyzing beam which sweeps across either the points or the lines, and simultaneously counting pulses are generated corresponding to predetermined increments of distance on the screen. The counting pulses are transmitted to utilization apparatus only when the beam is travelling over the distance that is to be converted into digital information. Accordingly, the number of counting pulses received by the utilization apparatus is a measure of the analogue information independently of the repetition rate, the amplitude or the quiescent position of the analyzing beam.

More specifically, the screen may be an elongated sheet, such as a roll of positive or negative photographic film or a roll of ink-recording paper. The lines need not be continuous but may be defined by a series of discrete points. The analyzing beam may be a spot of visible or invisible light or if the sheet is generally illuminated, may be a scanning optical aperture.

The counting pulses are generated by simultaneously scanning a scale having a plurality of divisions corresponding to predetermined distances on the screen and by responding to variations produced in the scanning beam. The divisions are in the form of marks, lines, holes, changes in texture, or other indicia which can modify a scanning beam. The scale may be superimposed on the screen, or it may be on a separate screen. If the scale and the lines are on the same screen, the variations effected in the analyzing beam by the lines and the scale divisions are separable on the basis of intensity, color, polarization or other characteristic. The scale divisions may be non-uniformly spaced if it is desired to correct non-linearity in the analogue information or if some relationship other than proportionality, for example, a logarithmic relationship, is desired between the analogue and digital information.

Counting pulses are transmitted to utilization apparatus commencing with the instant the analyzing beam crosses one of the lines and terminating at the instant that the analyzing beam crosses the other of the lines. When the screen is an elongated sheet, it is moved continuously or intermittently lengthwise bringing successive segments of the lines under analysis. If the lines are not formed from discrete points, synchronization is arranged in order to select only the series of counting pulses that correspond to predetermined segments of the lines. In one form of the invention the synchronization is effected by means of timing marks on the screen having predetermined lengthwise spacings.

In order that the invention may be more fully understood, it will now be described with reference to the accompanying drawing wherein the single figure is a block schematic diagram of a particular embodiment of the invention.

Referring now to the drawing, a curve 10, which may represent some function of time, is recorded on a screen 11, which is illustrated as a strip of motion picture film having sprocket holes 34. The screen 11 is adapted to be transported through a film gate 12 by sprockets 13 which are driven continuously or intermittently at a substantially constant speed by a motor 35. An amplitude reference line 14, which may correspond to zero, is also recorded on the screen 11. A plurality of timing marks 15 are recorded between the line 14 and the adjacent sprocket holes 34 to indicate at which points the amplitude of the curve 10 is to be measured.

The transverse distance between the amplitude reference line 14 and the curve 10 is adapted to be measured by an analyzing beam which recurrently sweeps transversely across the screen 11 so that it first crosses the amplitude reference line 14 and then crosses the curve 10 in the course of its travel. Synchronized with the analyzing beam is another beam which sweeps simultaneously, though not necessarily at the same linear speed, across a scale formed on a stationary screen 16 on which scale divisions are indicated by closely spaced marks 17, such as equally spaced parallel lines.

Although both beams may be generated mechanically, it is convenient to employ a cathode ray tube 18 connected to a sweep circuit 19 which recurrently deflects the electron beam with the result that a flying spot of light traces a horizontal line on the face of the tube 18. The flying spot is focused through an optical system 22 against the screen 11. The synchronous beam for the screen 16 may be conveniently derived by placing a conventional beam splitter 23, such as a semi-silvered mirror, in the path of the beam from the optical system 22 to reflect a portion of the light of the beam against the screen 16.

The amplitude of the curve 10 is recurrently measured by counting the number of scale marks 17 on the screen 16 that are traversed by the flying spot thereon as the analyzing beam travels on the screen 11 from the amplitude reference line 14 to the curve 10.

Photoelectric devices 27 and 24, associated with the screens 11 and 16, respectively, are responsive to the reflected or transmitted light therefrom. Each time the beam crosses the amplitude reference line 14, the light thereof is varied causing the photoelectric device 27 to produce what may be termed a "starting" pulse. When the beam passes the curve 10, the photoelectric device 27 generates what may be termed a "stopping" pulse. Meanwhile, the photoelectric device 24, associated with the screen 16 produces counting pulses each time the beam crosses a scale mark 17. The "starting" and "stopping" pulses are employed to generate a keying or gating wave which permits the counting pulses to be transmitted to utilization apparatus 36 only during the interval corresponding to the amplitude of the curve 10, as will be more fully described below.

In order that the digital information may correspond to predetermined points along the curve 10, a photoelectric device 26 is provided adjacent the timing marks 15. Each time one of the marks 15 is in alignment with the transverse line on the screen 11 traversed by the analyzing beam, the light from the beam to the photoelectric device 26 is abruptly varied and a timing pulse is accordingly generated.

The pulses from the photoelectric device 27 are amplified by an amplifier 31 and applied through a gate circuit 30 to a rectangular wave generator 32. The pulses from the photoelectric device 26 are amplified by an amplifier 28 and applied to a pulse generator 29. The generator 29 serves to obtain from several sweeps of the beam across each one of the timing marks 15 a single pulse in predetermined time relationship to the particular timing mark. This pulse is of sufficient duration to include the entire useable distance of one sweep of the analyzing beam. The generator 29 may, for example, comprise a first monostable or "one shot" multivibrator which responds to the first pulse of each series of timing pulses to generate a wave having a duration somewhat greater than the duration of each series of timing pulses. The generator 29 may then include a second monostable multivibrator to generate a gating pulse having a duration corresponding to one sweep of the analyzing beam.

Alternatively, it is equally feasible to generate timing pulses which are mechanically timed in constant spatial relationship to the sprocket holes 34.

The gating pulse is applied from the pulse generator 29 to the gate circuit 30 with the result that only the "starting" and "stopping" pulses having the desired timing can operate the rectangular wave generator 32. The rectangular wave generator 32 may comprise a bistable multivibrator which is turned on and off by the "starting" and "stopping" pulses, respectively. The length of the rectangular wave corresponds to the amplitude of the curve 10.

The counting pulses are amplified by an amplifier 25 and supplied to a gate circuit 33 that is under the control of the rectangular wave generator 32. Accordingly, when the path of the analyzing beam is aligned with a timing mark and when the amplitude reference line 14 is intercepted by the beam, a "starting" pulse is permitted to pass through the gate circuit 30 and to initiate a rectangular wave in the generator 32. The rectangular wave thereupon renders the gate circuit 33 effective to transmit the counting pulses from the amplifier 25 to the utilization apparatus 36. From this instant on, each pulse produced by the photoelectric device 24 when the beam sweeps a division on the screen 16 passes through the gate circuit 33. When the analyzing beam crosses the curve 10 during this particular sweep, the photoelectric device 27 generates a "stopping" pulse which passes through the gate circuit 30 and terminates the rectangular wave, thereby closing the gate circuit 33 and preventing any further passage of the counting pulses. The number of pulses transmitted by the gate circuit 33 is consequently an accurate measure of the amplitude of the curve 10 at the point corresponding to the particular timing mark 15.

The utilization apparatus 36 to which the counting pulses or digital data are supplied may comprise either a binary counter 26 and/or a decimal counter 37. The binary counter 26 is illustrated as operating a card punch 38 through relays 39. The decimal counter 37 may operate a tape printer 41, a magnetic tape recorder or other recording apparatus. A connection 40 serves to reset the counters 26 and 37 for each new digital measurement.

Initially the apparatus is optically adjusted with the aid of an operator's viewing microscope 42, which may be conveniently located on the other side of the beam splitter 23 from the screen 16. A scale identical to the one recorded on the screen 16 is temporarily positioned in the film gate 12. The pulses from the photoelectric devices 24 and 27 may be applied to the horizontal and vertical deflection circuits of a test oscilloscope (not shown). The optical system 22 may then be adjusted until a steady figure appears on the oscilloscope screen indicating that the pulses from the two photoelectric devices are in unison.

It is to be observed that the sweep frequency of the analyzing beam need not be accurately controlled and is primarily limited by the required brightness of the flying spot on the tube 18 and the operating speeds of the binary counter 26 and/or the decimal counter 37 and the recording apparatus. The brightness of the spot in turn depends on the required definition. If a one megacycle per second counter is used and the unit is one thousandth of full scale, then the sweep frequency is limited to one thousand cycles per second. If a mechanical recording device like a card punch or typewriter is used the sweep frequency will be more severely limited.

It is to be understood that various modifications may be made in the illustrated apparatus without departing from the scope of the appended claims. For example, several different curves can be recorded on the screen 11 and simultaneously converted into digital information. The different waves may be distinguished by recording them in different colors and employing a corresponding number of photoelectric devices like device 27, each equipped with a suitable color filter. Alternatively, a counting gate circuit (not shown) may be interposed between the photoelectric device 27 and the amplifier 31 adapted to pass only the "starting" pulse and the particular one of the pulses representing the particular curve to be converted to digital information for the utilization apparatus 36. Other utilization apparatus can be supplied to measure the other curves.

I claim:

1. Apparatus for converting a continuously variable curve into a plurality of counting pulses corresponding to the amplitude of the curve at predetermined intervals, comprising an elongated sheet along which is recorded the curve to be converted and a line of reference from which the amplitude of the curve may be measured, means for sweeping an analyzing beam across the reference line and the curve, means to move said sheet lengthwise whereby the beam scans the curve at successive intervals, an elongated scale having a row of predeterminedly spaced marks thereon, means for sweeping an analyzing beam over said scale simultaneously with the scanning of said elongated sheet, photo-sensitive means responsive to the variation in the beam by the marks on said scale for generating a plurality of counting pulses, a switching circuit interposed in the transmission path of the counting pulses, photo-sensitive means responsive to the variation in the beam as it passes the reference line for initiating a switching wave, photo-sensitive means responsive to the variation of the beam as it passes the curve for terminating the switching wave, and means for applying the switching wave to said switching circuit whereby the number of counting pulses transmitted by said switching circuit represents the amplitude of the curve.

2. Apparatus for converting a continuously variable curve into a plurality of counting pulses corresponding to the amplitude of successive segments of the curve, comprising an elongated sheet along which is recorded the curve to be converted and a line of reference from which the amplitude of the curve may be measured, means for sweeping a beam of light substantially perpendicularly across the reference line and past the curve, means to translate said sheet substantially parallel to the reference line whereby the beam scans successive segments of the curve, an elongated scale having a row of substantially uniformly spaced marks thereon, means for sweeping the beam over said scale simultaneously with the scanning of said elongated sheet, photo-sensitive means responsive to the variation in the light beam by the marks of said scale for generating a plurality of counting pulses, a switching circuit interposed in the transmission path of the counting pulses, photo-sensitive means responsive to the variation in the beam as it passes the reference line for initiating a switching wave, photo-sensitive means responsive to the variation of the beam as it passes the curve for terminating the switching wave, and means for applying the switching wave to said switching circuit whereby the number of counting pulses transmitted by said switching circuit represents the amplitude of the curve.

3. Apparatus according to claim 2 further provided with timing means responsive to timing marks on the sheet having predetermined lengthwise spacings for selecting only the counting pulses corresponding to predetermined segments of the curve.

4. An analogue to digital converter comprising, means to present for scanning purposes a replaceable record sheet indicating analogue information in the form of the distance between two delineated points which are spaced apart transversely of said sheet, and the position of at least one of which is established by a recorded marking on said sheet, a member disposed in stationary relation to said sheet presenting means and providing a scale of optical indicia spaced at intervals to represent predetermined increments of distance transversely of said sheet, light generating means disposed in stationary relation to said sheet presenting means, means to produce a scan across said sheet and over said points with light from said generating means, and to produce a synchronous scan over indicia on said scale with light from said light generating means, means photoelectrically responsive to said scanning of indicia on said scale to generate pulses corresponding to the scanned indicia, and means photoelectrically responsive to said scanning of the first and second of said points which are scanned to render effective and ineffective, respectively, said pulse generating means.

5. An analogue to digital converter as in claim 4 in which said light generating means comprises a cathode ray tube which operably develops a spot of light on the face thereof, and in which said means to produce a scan comprises electronic means to deflect said light spot over said face to thereby produce movement of said light spot, and optical means to project an image of said moving light spot.

6. An analogue to digital converter comprising, means to present for scanning purposes a replaceable record sheet having a flat transverse lie and indicating analogue information in the form of the straight-line transverse distance between two delineated points which are spaced apart in the direction of said transverse lie, and the position of at least one of which is established by a marking recorded on said sheet, a member disposed in stationary relation to said sheet presenting means and providing a flat scale of optical indicia spaced at straight line intervals to represent predetermined increments of distance transversely of said sheet, scanner means to develop an angularly moving analyzing light beam directed to sweep through an angle at least partly subtended by said straight line distance between said points to thereby scan across said sheet and over said points, said scanner means being adapted to synchronously scan over indicia on said scale with a light beam directed to sweep through an angle subtended by a straight line distance on said scale, means photoelectrically responsive to said scanning of indicia on said scale to generate pulses corresponding to the scanned indicia, and means photoelectrically responsive to said scanning of the first and second of said points which are scanned to render effective and ineffective, respectively, said pulse generating means.

7. An analogue to digital converter comprising, means to present in a scanning zone a portion of an elongated replaceable record sheet indicating analogue information in the form of the distance at different lengthwise positions of said screen between transversely opposite points on two delineated lines extending in the lengthwise direction of said sheet and spaced apart in the transverse direction thereof, at least one of said lines being recorded as a marking on said sheet, a member disposed in stationary relation to said sheet presenting means and providing a scale of optical indicia spaced apart at intervals representing predetermined increments of distance transversely of said sheet, scanner means to develop an analyzing light beam directed to recurrently scan at said scanning zone transversely of said sheet and over respective points in said scanning zone on said lines, said scanner means being adapted to synchronously scan over indicia on said scale with a light beam, means to move said sheet lengthwise to bring longitudinally successive portions thereof into said zone, means photoelectrically responsive to said scanning of indicia on said scale to generate pulses corresponding to the scanned indicia, and means photoelectrically responsive to the scanning of the first and second of the points on said lines which are scanned to render effective and ineffective, respectively said pulse generating means.

8. A converter as in claim 7 in which said sheet has lengthwise spaced timing marks associated therewith and in which, during the lengthwise movement of said sheet, said marks are brought one by one to a locality of fixed lengthwise position relative to said zone, said converter further comprising means responsive to the presence of each mark at said locality to select the pulses then generated by said pulse generating means for transmission to a utilization device.

9. An analogue to digital converter comprising, means to present for scanning purposes a replaceable record sheet indicating analogue information in the form of the straight-line transverse distance between two delineated points which are spaced apart in the direction of said transverse lie, and the position of at least one of which is established by a recorded marking on said sheet, a member disposed in stationary relation to said sheet presenting means and providing a scale of optical indicia spaced at intervals to represent predetermined increments of distance transversely of said sheet, scanner means to develop an analyzing light beam characterized by a forward scanning and a reverse fly-back motion and directed during said scanning motion to scan across said sheet and over said points, said scanner means being adapted to synchronously scan over indicia on said scale with a light beam, means photoelectrically responsive to said scanning of indicia on said scale to generate pulses corresponding to the scanned indicia, and means photoelectrically responsive to said scanning of the first and second of said points which are scanned to render effective and ineffective, respectively, said pulse generating means.

10. An analogue to digital converter comprising, means to present for scanning purposes a replaceable record sheet having a flat transverse lie and indicating analogue information in the form of the straight-line transverse distance between two delineated points which are spaced apart in the direction of said transverse lie, and the position of at least one of which is established by a recorded marking on said sheet, a member disposed in stationary relation to said sheet presenting means and providing a flat scale of optical indicia spaced at straight line intervals to represent predetermined increments of distance transversely of said sheet, scanner means to develop an angularly moving analyzing light beam characterized by a forward scanning motion and a reverse flyback motion and directed to sweep through an angle at least partly subtended by said straight line distance between said points to thereby scan during said scanning motion across said sheet and over said points, said scanner means being adapted to synchronously scan over indicia on said scale with a light beam directed to sweep through an angle subtended by a straight line distance on said scale, means photoelectrically responsive to said scanning of indicia on said scale to generate pulses corresponding to the scanned indicia, and means photoelectrically responsive to said scanning of the first and second of said points which are scanned to render effective and ineffective, respectively, said pulse generating means.

11. An analogue to digital converter comprising, means to present in a scanning zone a portion of an elongated replaceable record sheet having a flat transverse lie and indicating analogue information in the form of the distance at different lengthwise positions of said screen between transversely opposite points on two delineated lines extending in the lengthwise direction of said sheet and spaced apart in the transverse direction thereof, at least one of said lines being recorded as a marking on said sheet, a member disposed in stationary relation to said sheet presenting means and providing a flat scale of optical indicia spaced apart at intervals representing predetermined increments of distance transversely of said sheet, scanner means to develop a recurrently scanning, angularly moving analyzing light beam directed to sweep through an angle at least partly subtended by the straight line distance between respective points in said zone on said lines to thereby recurrently scan at said zone transversely of said sheet and over said last named points, said scanner means being adapted to synchronously scan over indicia on said scale with a light beam directed to sweep through an angle subtended by a straight line distance on said scale, means to move said sheet lengthwise to bring longitudinally successive portions thereof into said zone, means photoelectrically responsive to said scanning of indicia on said scale to generate pulses corresponding to the scanned indicia, and means photoelectrically responsive to said scanning of the first and second of said points which are scanned to render effective and ineffective, respectively, said pulse generating means.

12. An analogue to digital converter comprising, means to present in a scanning zone a portion of an elongated replaceable record sheet having a flat transverse lie and indicating analogue information in the form of the distance at different lengthwise positions of said screen between transversely opposite points on two delineated lines extending in the lengthwise direction of said sheet and spaced apart in the transverse direction thereof, at least one of said lines being recorded as a marking on said sheet, a member disposed in stationary relation to said sheet presenting means and providing a flat scale of optical indicia spaced apart at intervals representing predetermined increments of distance transversely of said sheet, scanner means to develop a recurrently scanning, angularly moving analyzing light beam characterized by a forward scanning motion and a reverse fly-back motion and directed to sweep through an angle at least partly subtended by the straight line distance between respective points in said zone on said lines to thereby recurrently scan at said zone during each scanning motion transversely of said sheet and over said last named points, said scanner means being adapted to synchronously scan over indicia on said scale with a light beam directed to sweep through an angle subtended by a straight line distance on said scale, means to move said sheet lengthwise to bring longitudinally successive portions thereof into said zone, means photoelectrically responsive to said scanning of indicia on said scale to generate pulses corresponding to the scanned indicia, and means photoelectrically responsive to said scanning of the first and second of said points which are scanned to render effective and ineffective, respectively, said pulse generating means.

13. An analogue to digital converter comprising, means to present in a scanning zone a portion of an elongated replaceable record sheet indicating analogue information in the form of the distance at different lengthwise positions of said sheet between transversely opposite points on two delineated lines extending in the lengthwise direction of said sheet and spaced apart in the transverse direction thereof, at least one of said lines being recorded as a marking on said sheet, a member disposed in stationary relation to said sheet presenting means and providing a scale of optical indicia spaced apart at intervals representing predetermined increments of distance transversely of said sheet, scanner means to develop an analyzing light beam characterized by a forward scanning motion and a reverse fly-back motion and directed to recurrently scan at said scanning zone transversely of said screen and over respective points in said scanning zone on said lines, said scanner means being adapted to synchronously scan over indicia on said scale with a light beam, means to move said sheet lengthwise to bring longitudinally successive portions thereof into said zone, means photoelectrically responsive to said scanning of indicia on said scale to generate pulses corresponding to the scanned indicia, and means photoelectrically responsive to the scanning of the first and second of the points on said lines which are scanned to render effective and ineffective, respectively, said pulse generating means.

14. An analogue to digital converter comprising, means to present for scanning purposes a replaceable record sheet indicating analogue information in the form of the distance between two delineated points which are spaced apart transversely of said sheet and the position of at least one of which is established by a marking recorded on said sheet, a member disposed in stationary relation to said sheet presenting means and providing a scale of indicia spaced at intervals to represent predetermined increments of distance transversely of said sheet, scanner means to develop a scanning light beam, beam splitter means disposed in the path of said developed beam to split the same into first and second beams of which the first is directed to scan across said sheet and over said points, and of which the second is directed to synchronously scan over indicia on said scale, means photoelectrically responsive to said scanning of indicia on said scale to generate pulses corresponding to the scanned indicia, and means photoelectrically responsive to said scanning of the first and second of said points which are scanned to render effective and ineffective, respectively, said pulse generating means.

References Cited in the file of this patent

UNITED STATES PATENTS

| | | |
|---|---|---|
| 2,494,441 | Hillier | Jan. 10, 1950 |
| 2,545,331 | Works | Mar. 13, 1951 |
| 2,624,848 | Hancock | Jan. 6, 1953 |
| 2,635,195 | Hancock | Apr. 14, 1953 |
| 2,680,241 | Gridley | June 1, 1954 |
| 2,730,698 | Daniels | Jan. 10, 1956 |